No. 690,181. Patented Dec. 31, 1901.
A. POUTEAUX & A. WOLFF.
ELECTRIC ACCUMULATOR.
(Application filed Apr. 9, 1901.)
(No Model.)
FIG.1. FIG.2. FIG.3.
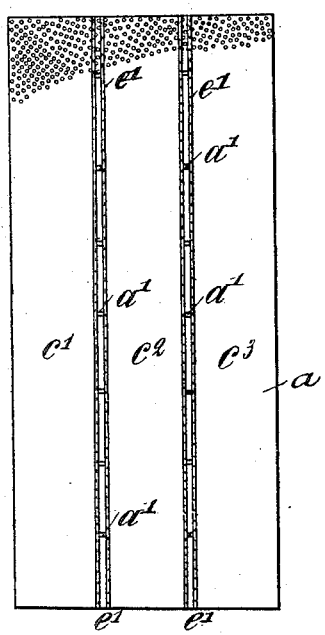
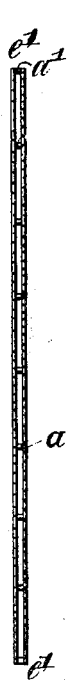
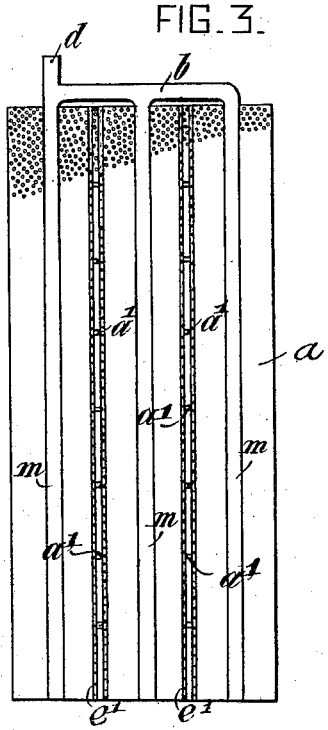
Fig.4.
Fig.6.
FIG.5.
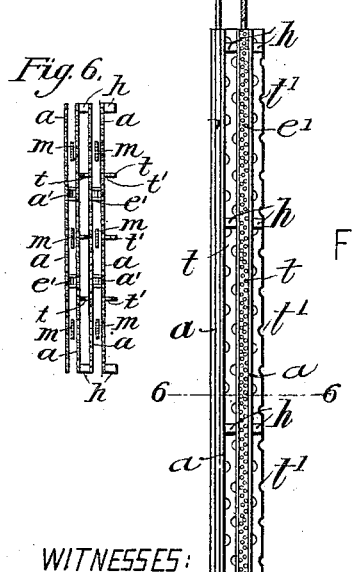
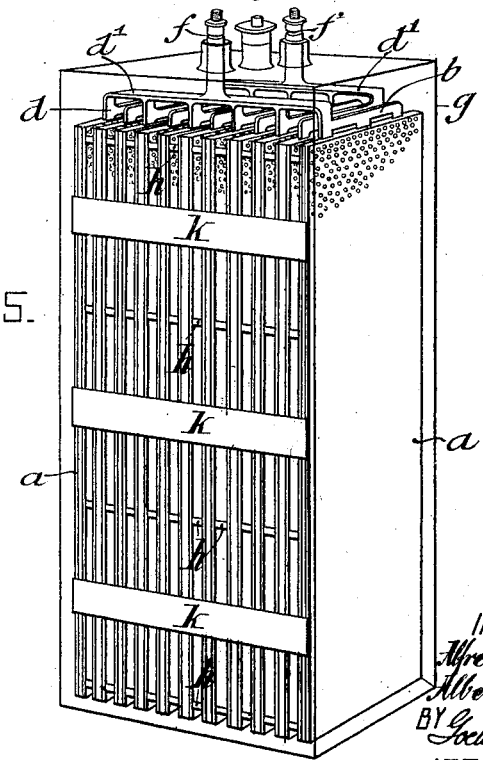
WITNESSES:
Joseph H. Niles
George Seibel
INVENTORS:
Alfred Pouteaux
Albert Wolff
BY
Soeur & Wahle
ATTORNEYS.

UNITED STATES PATENT OFFICE.

ALFRED POUTEAUX AND ALBERT WOLFF, OF DIJON, FRANCE.

ELECTRIC ACCUMULATOR.

SPECIFICATION forming part of Letters Patent No. 690,181, dated December 31, 1901.

Application filed April 9, 1901. Serial No. 55,093. (No model.)

*To all whom it may concern:*

Be it known that we, ALFRED POUTEAUX and ALBERT WOLFF, citizens of the Republic of France, and residents of Dijon, France, have invented a new and useful Improvement Relating to Electric Accumulators, which improvement is fully set forth in the following specification.

This invention relates to secondary batteries; and the object of the invention is to provide a light and durable battery of this type; and for this purpose the invention consists of a secondary battery comprising an exterior casing, an electrolyte in the same, a plurality of positive and negative elements immersed in said electrolyte and composed each of two perforated parallel plates, perforated partition-bars located between and connected to both of said plates and dividing the space between them into a plurality of compartments, said partition-bars being composed each of two parallel strips perforated in the direction to afford communication between said compartments and cross-bars separating said strips from each other, active material charged into said compartments, but not into the spaces between the strips of the partition-bars, a conducting-core in each compartment, collecting-bars, one to each element, connecting the cores of the same, a terminal connected with each collecting-bar, and two terminal bars, one connecting all the terminals of the positive and the other all the terminals of the negative elements of the battery, as will be fully described hereinafter and finally pointed out in the claims.

In the accompanying drawings, Figure 1 is a plan view of one of the plates of one of the elements of our improved secondary battery, showing the partition-bars superposed thereon. Fig. 2 shows an individual partition-bar of our improved secondary battery. Fig. 3 is a plan view showing a plate with the partition-bars and cores superposed thereon. Fig. 4 is a side view of two dissimilar elements of our improved battery, showing the same connected together, the active material and one core, however, being removed, the core being broken off on line 4 4, Fig. 3, from one compartment of the right-hand element for the purpose of exposing the perforated partition-bar. Fig. 5 is a perspective view showing the battery assembled, and Fig 6 is a horizontal section through two of the elements on line 6 6, Fig. 4.

Similar letters of reference indicate corresponding parts.

Referring to the drawings, $a$ indicates one of the plates of our improved battery. Each element of the battery is composed of two of these plates connected together by longitudinal partition-bars $e'$. The plates are perforated over their entire surface, only a small portion, however, being indicated in the drawings as being perforated. The partition-bars divide the space between the two plates into compartments $c'$ $c^2$ $c^3$, and said bars are perforated in the direction so as to afford communication between said compartments. Within each compartment, approximately at the center of the same, is arranged a longitudinal core $m$ of any suitable conducting material, such as copper, the cores $m$ of each element being connected at their projecting ends by a collecting-bar $b$, which is provided with a terminal $d$. The space between the compartments is filled with suitable chemical mixture according to the nature of the element to be formed, said mixture in the form of a paste filling compactly the said compartments and also the perforations in the plates and being firmly held thereby. The partition-bars $e'$ are composed each of two strips arranged parallel and connected by cross-pieces $a'$ at frequent intervals. The space between the two strips of each partition-bar is not filled with the paste, but is open, so that the electrolyte can enter into the same and pass freely into the compartments. Each element when made up is connected with the adjacent element by means of connecting-blocks $h$ and connecting-strips $t$, extending longitudinally of the plates and provided with notches $t'$. When elements to the desired number are connected in this manner, they are then further connected by exterior connecting-bands $k$, and the terminals $d$ of elements of corresponding character are all connected by a connecting-bar $d'$, from which extends a binding-post $f$. The so-formed battery is then inserted into a suitable box or receptacle $g$, which is properly reinforced. The electrolyte is then put in and the receptacle closed.

For rendering the cell as light as possible the plates *a*, partition-bars *e'*, strips *t*, blocks *h*, and bars *k* are preferably made of celluloid covered with a layer of pure caoutchouc. In order to render the same perfectly proof against the action of sulfuric acid or nascent oxygen or ozone, the caoutchouc is dissolved in a mixture of benzol and amyl acetate, the latter substance being employed for the purpose of softening the celluloid and causing the caoutchouc to penetrate and adhere strongly to the celluloid upon evaporation of the solvent. As a cement for connecting the various parts may be employed a solution of endecanitric cellulose in acetate of camphorated amyl. As an active material for the negative electrode may be employed a mixture of red lead and finely-reduced coke. The presence of the coke has the effect of dividing the material and exposing a large surface to the action of the exciting liquid, so that chemical action takes place more freely throughout the entire mass of material in the element. As an active material for the positive element sulfid of lead may be used. The electrolyte consists of an aqueous solution of sulfuric acid of 20° Baumé. During the operation of the battery the red lead is converted into peroxid of lead and the sulfid of lead is reduced, yielding sulfureted hydrogen and metallic lead.

Having thus described our invention, we claim as new and desire to secure by Letters Patent—

1. A secondary battery, consisting of an exterior casing, an electrolyte in the same, a plurality of positive and negative elements immersed in said electrolyte and composed each of two perforated parallel plates, perforated partition-bars located between and connected to both of said plates and dividing the space between them into a plurality of compartments, said partition-bars being composed each of two parallel strips perforated in the direction to afford communication with said compartments and cross-bars separating said strips from each other, active material charged into said compartments, but not into the spaces between the strips of the partition-bars, a conducting-core in each compartment, collecting-bars, one to each element, connecting the cores of the same, a terminal connected with each collecting-bar, and two terminal bars, one connecting all the terminals of the positive and the other all the terminals of the negative elements of the battery, substantially as set forth.

2. In a secondary battery, the combination, with two parallel plates, of a partition-bar located between the same and composed of two strips perforated in the direction of said plates and separated from each other by cross-pieces, substantially as set forth.

3. In a secondary battery, an active-material container composed of celluloid coated with a layer of pure caoutchouc, substantially as set forth.

In testimony whereof we have signed this specification in the presence of two subscribing witnesses.

ALFRED POUTEAUX.
ALBERT WOLFF.

Witnesses:
JEAN KUHUTÉ,
LÉON WOLFF.